April 26, 1966     E. R. EVANS     3,247,877
SCREW
Filed Oct. 1, 1962
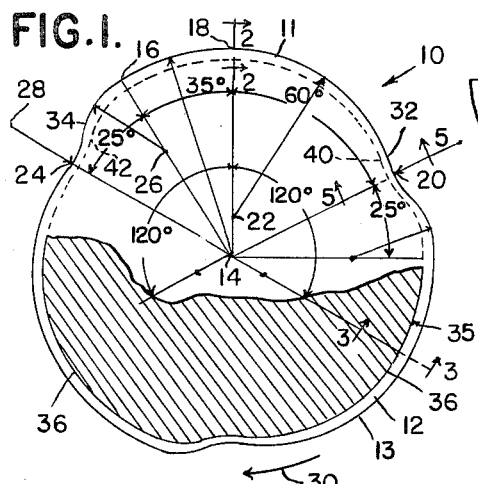
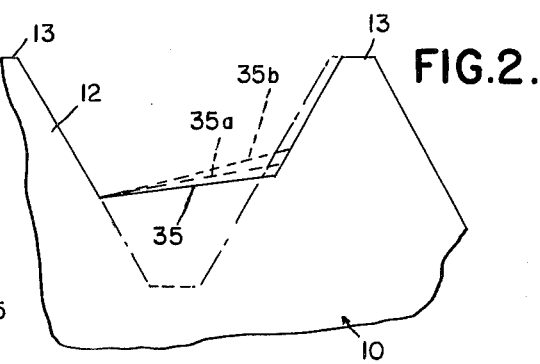
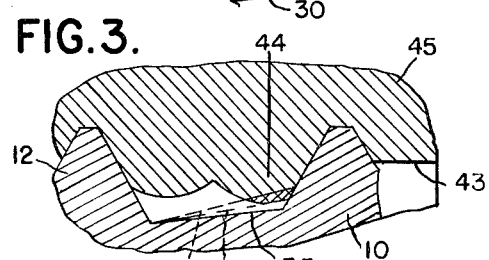
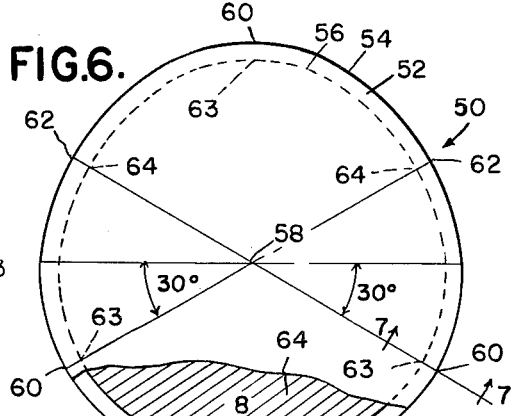
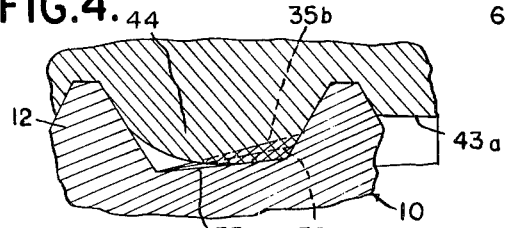
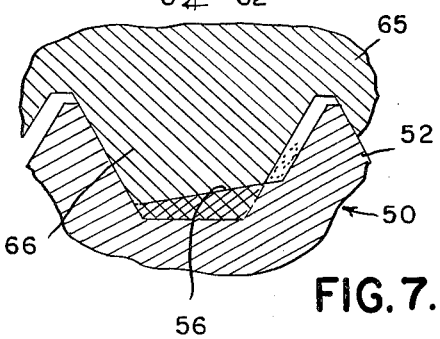
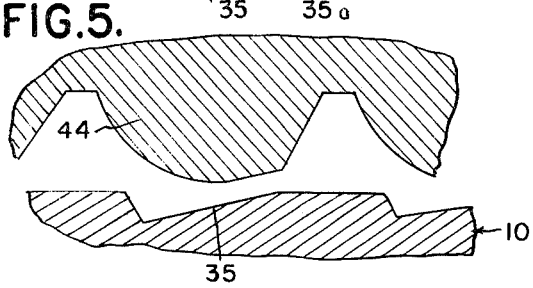
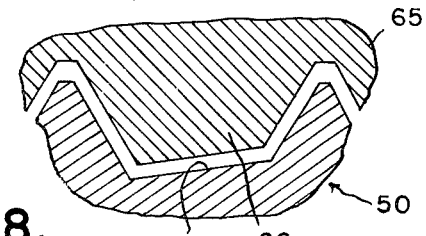
INVENTOR.
EDWIN R. EVANS
BY Whittemore, Hulbert & Belknap
ATTORNEYS

United States Patent Office 3,247,877
Patented Apr. 26, 1966

---

3,247,877
SCREW
Edwin R. Evans, Orchard Lake, Mich., assignor to Lock Thread Corporation, Detroit, Mich., a corporation of Delaware
Filed Oct. 1, 1962, Ser. No. 227,301
4 Claims. (Cl. 151—22)

This invention relates generally to screws and refers more particularly to screws designed to have a thread locking interference fit with a mating internally threaded member.

It is desirable in lock bolting practice to keep the assembly drag torque low, without unduly sacrificing effective locking action, in order to utilize more of the turning effort to develop a high tension in the threaded member when fully installed. It is also important to maintain a narrow assembly torque range so that tension developed in seating will be more uniform and hence more effective and predictable. In my earlier patent, No. 2,437,636, I desclosed a thread locking action dependent upon interference between the minor diameter (thread crest) of a tapped hole and the minor diameter (thread root) of the screw. Unfortunately, however, it proved necessary in practice to maintain a very close control on the minor diameter of the tapped hole in order to keep the assembly drag torque low and within a narrow range. While the thread lock in my prior patent has gained fair acceptance, the close tolerance requirements have been the main barrier to more widespread use.

One of the essential objects of this invention is to provide an interference thread lock which will permit the use of wider minor diameter and other tolerances on the internal and external thread. This is of course desirable in that less cost will be involved in the machining of the internal thread, standard internal thread gauging will be permitted, and my improved male fastener can generally be substituted in a standard tapped hole without modification of the hole.

Another object is to provide an interference thread lock in which the level and range of assembly drag torque are reduced. As a result, greater clamping loads, that is higher bolt tension can be achieved, and such clamping loads and tensioning will be more accurate and predictable; fasteners can be assembled faster and with less effort thereby lowering operator fatigue; smaller power assembly tools may be employed; and the assembly tool is less likely to cam out of a slotted socket set screw or to break the slot.

Another object of the invention is to provide a fastener designed for root interference with the crest of an internal thread in which the root diameter may be increased without objectionably increasing assembly drag torque, thereby increasing the strength of the fastener, far in excess of any current fastener now in use.

Another object is to provide a fastener which may be used as a chipless self-tapping, self-locking internal cold thread forming fastener. Specifically, this is accomplished by a lobed thread form in which the lobes are spaced circumferentially. Lobe root contact provides self-centering of the fastener or screw upon entry into a drilled hole and, accordingly, it turns in more nearly perpendicular without special guidance.

Another object is to provide a thread locking screw of the self-tapping type which will produce an improved internal thread free of roughness, overlaps, and seams.

Another object is to provide a thread locking screw of the self-tapping type which will produce a stronger thread assembly, particularly the internal thread, because of an improved compacting and cold working of the thread material.

Another object is to provide a chipless self-tapping screw which can be easily manufactured.

Other objects and features of the invention will become apparent as the description proceeds, especially when taken in conjunction with the accompanying drawings, wherein:

FIGURE 1 is an end view, partly in section, of a screw which can be used as a self-tapping screw in a drilled hole or as an improved lock thread in a pretapped hole embodying my invention.

FIGURE 2 is a diagrammatic view illustrating the thread contour at section 2—2 of FIGURE 1, and also showing superimposed thereon the basic or standard American National thread form.

FIGURE 3 is a sectional view taken on the line 3—3 of FIGURE 1, showing the fastener assembled in a drilled hole in which it has formed an internal thread.

FIGURE 4 is similar to FIGURE 3 but shows the fastener assembled in a drilled hole of slightly smaller diameter than the hole in FIGURE 3.

FIGURE 5 is similar to FIGURES 3 and 4, but is taken on the line 5—5 of FIGURE 1.

FIGURE 6 is an end view, partly in section, of another fastener embodying my invention.

FIGURE 7 is a sectional view taken on the line 7—7 of FIGURE 6 showing the high point of the fastener in a pre-tapped hole.

FIGURE 8 is a sectional view taken on the line 8—8 of FIGURE 6 showing the low point of the fastener in a pre-tapped hole.

Referring now more particularly to the drawings and especially to FIGURES 1–5, the screw 10 has a continuous spiral external thread 12 of the irregular lobe form shown. The screw thread is formed by any suitable means such for example as rolling dies, from an elongated blank having the lobe form or outline of the thread crest 13 indicated in FIGURE 1 throughout substantially its entire length.

The center of the screw, and of the blank from which it is formed, is indicated at 14, and the portion of one thread crest lobe 11 between points 16 and 18 is an arc of approximately 35° with its center at 14. The portion of the thread crest lobe between points 18 and 20 is an arc of approximately 60° formed on a radius centered at 22. That portion of the thread crest lobe between points 16 and 24 is a compound arc, one part being formed on a radius centered at 26 and the other being formed on a radius centered at 28. These parts of the compound arc merge smoothly with each other as shown, and with the portions of the crest form on either side. Each convolution of the thread crest has the lobe form described above, and each lobe 11 is the same. While screw 10 has three lobes, in accordance with the preferred construction, the number of lobes may be two or more than three. Three or more lobes are preferred for better piloting when screwing into a drilled hole. Assuming the screw is threaded into a hole by clockwise rotation, indicated by arrow 30, the portion 32 of each lobe crest will be the leading portion, and the portion 34 thereof the trailing portion. The leading portion curves inward toward the screw axis, but less abruptly than the trailing portion.

The thread root 35 follows the outline in FIG. 1, and it will be noted that this outline corresponds roughly to the crest outline so that where the crest bulges outward in a lobe form the root does also to a degree. While the thread outline is preferably as shown, it may vary somewhat, depending on the form of the blank and on production methods. As shown, the thread is not uniform in depth; that is, the thread has a relatively deep flank dimension in the lobes and a relatively shallow flank dimension between the lobes. Nevertheless, the root, like the crest, is of generally lobe form having the lobes 36 where the crest is lobed and being relieved or of reduced radius between the lobes where the crest is of reduced radius.

The leading portion of the root is indicated at 40 and the trailing portion at 42, and it will be noted that the leading portion curves inward toward the screw axis less abruptly than the trailing portion, as was true of the leading and trailing portions of the crest. Each convolution of the thread root has the lobe form shown in FIGURE 1, and each lobe 36 is the same.

FIGURE 2 is a diagrammatic view illustrating the thread contour at the mid-point of a lobe. The flanks are of generally 60° form, and the root 35 is rather wide, being straight in axial section and inclined with respect to the screw axis at an angle of 6°. If desired, the root may be tapered at a steeper angle, for example 10° or 15° as indicated in dotted lines at 35a and 35b. The inclination of the root is uniform throughout the length of the thread. The root diverges in a direction away from the direction of load. For comparison purposes, the standard American National thread is shown in dot and dash lines in FIGURE 2.

The screw 10 is designed to be a self-tapping screw and is shown in FIGURE 3 screwed into a drilled hole 43 in a female member 45. FIGURE 3 shows the screw in a somewhat larger hole than FIGURE 4 and it will be noted that the material displaced by the screw thread moves radially inward toward the screw root to form the internal thread 44. The leading ends 32 and 40 of the crest and root of the screw thread have a very gentle radially inward taper facilitating the entry of the screw into the drilled hole and the displacement of material.

The material displaced may or may not contact the screw thread root, depending upon the size of the drilled hole. If the hole is relatively large, there may be no root contact even at the root lobes, as indicated by the 6° root 35 in FIGURE 3. Under these circumstances there will be no root interference. However, there will be substantial resistance to withdrawal of the fastener by reason of the abrupt angle of the trailing portion 34 of the thread. After the screw is assembled, displaced metal will tend to return behind the thread lobes and to lock in back of the trailing thread portions 34, offering substantial resistance to the withdrawal of the fastener.

Additional resistance to withdrawal of the fastener will be encountered if root interfence is present at the lobes. FIGURE 3 indicates root interference at the 10° root 35a and even greater interference at the 15° root 35b, such interference being shown by double hatching. Root interference is desirable in that it will resist withdrawal of the screw, and of course the abrupt trailing portion of the root will further resist withdrawal by reason of the partial return flow of displaced metal in back of the root trailing portion.

FIGURE 4 shows the same screw in a somewhat smaller drilled hole 43a in which there is increased root interference at the lobes. Interference exists even at the smaller 6° root taper. While a void is shown between the root of the screw thread and the crest of the internal thread, this space may in most instances be entirely filled by the extruded internal thread, resulting in higher assembly torque.

FIGURE 5 illustrates the thread relationship between lobes. The hole in FIGURE 5 may be considered that of FIGURE 4. It will be seen that there are substantial voids between both flanks and also between the roots. The internal thread in FIGURE 5 has the configuration imparted to it by the lobes of the screw.

Whether or not there is root interference, the screw 10 is particularly well adapted for self-tapping by reason of the gentle radially inward taper at 32 of the leading end of the thread crest which facilitates assembly. Moreover, the more abrupt trailing portion of the thread crest provides a substantially greater resistance to withdrawal. Of course where there is root interference the resistance to withdrawal is increased. While the assembly drag torque is also increased, this increase is not a serious factor because the interference is relieved between the lobes as shown in FIGURE 5, reducing band pressure. The root interference is concentrated at the lobes and is relieved between the lobes. Such interference is a maximum at the lobes and diminishes toward the reliefs. While FIGURE 5 shows a void at the root in the thread region between the lobes there may actually be some root interference which at least would be reduced or relieved with respect to that interference occurring at the lobes because the reduced root radius between the lobes.

The fastener 10 may also be screwed into a pretapped hole in which the minor diameter of the internal thread is dimensioned for interference with at least a portion of the root lobes of the fastener. FIGURES 4 and 5 may be considered as a showing of the fastener in a pretapped hole and it will be noted that there is interference at the lobes of the external thread root. There may or may not be flank voids for the accommodation of displaced metal. Even without flank voids at the lobes, there is sufficient void space at the bottom of the root, FIGURE 4, together with the void space between the lobes to accommodate the flow of displaced metal. While there is no root contact shown in FIGURE 5, there may actually be a degree of root contact which would, as previously noted, provide much less interference than at the lobes. The interference is a maximum at the lobes and diminishes progressively therefrom.

As pointed out above, the root interference in connection with the use of the thread lock shown in my prior patent was apt to produce too high a level and too wide a range of assembly drag torque unless the diameter of the tapped hole has closely controlled. By reason of the relieved root interference resulting from the lobed thread form of the fastener 10, an acceptable level and range of assembly drag torque can be had even though the tolerance on the tapped hole is not closely controlled. This is due primarily to the lobed root form which provides interference relief between lobes.

Any desired starting thread for the self-tapping and other fasteners can be provided by using a conventional gimlet point of the same depth and thread form as on the body of the part; this is, merely point the end to the desired outside diameter and root size. (See Evans Patent 2,556,174.)

A short flank, FIGURE 4, on the screw thread prevents the fastener from pulling out in shear. While this flank is not large and in fact may disappear between lobes, FIGURE 5, it is sufficient for the purpose. The taper on the screw thread root provides a wedging action where interference occurs, further resisting pulling out of the screw.

While it was mentioned that FIGURE 4 might be considered as a section at the lobe of screw 10 in a pretapped hole, actually FIGURE 7, described hereinafter, is a better illustration of the thread relationship, and may be considered as such, because it shows flank clearance to receive displaced metal.

FIGURES 6-8 illustrate another form of the invention. The fastener 50 there shown is primarily designed to thread into a pre-tapped hole, although it may be used as a self-tapping fastener. The fastener 50 has a continuous spiral external thread 52 which is of uniform size and shape, that is the thread form will appear the same in section no matter where the section is taken (see FIGURES 7 and 8). The thread crest is indicated at 54 and root at 56, and these will be seen to be non-circular, although the dimension across the crest (or root) taken at any angle through the center of the fastener is the same, or at least substantially so.

The screw is formed from a blank whose center corresponds with the center 58 of the screw and whose external surface outline corresponds to the thread crest outline in FIGURE 6. The cross-sectional shape of the blank is the same throughout substantially its full length. This outline, as shown, is non-circular, although the distance across the blank measured at any angle through the center thereof is the same. The blank has three lobes; that is, three points which are of maximum distance from the center 58, and three reliefs between the lobes which are of minimum distance from the blank center. The lobes are at the points 60, while the reliefs are at the intermediate points 62.

The blank from which the screw in FIGURE 6 is made can be formed by using a cam which has the desired blank contour in enlarged size, to operate through a series of reducing levers against a sliding grinding or cutting tool which moves in and out in time with the cam and reproduces the cam pattern in reduced size on the rotating blank. Such blanks can also be made by heading round wire stock into a die which has the shape of the desired screw blank, or round wire stock may be extruded into an extrusion die in which the extrusion neck has the desired blank form.

The thread is formed on the blank by a suitable means such, for example, as by thread rolling dies, and as stated the thread outline and depth is uniform throughout. The thread crest has lobes at the points 60 of maximum radius from the center. And crest reliefs at the points 62 between the lobes. The thread root has lobes 63 and reliefs 64 which occur at the same points as the crest lobes and reliefs.

The thread flanks are of generally 60° form, and the root 56 is rather wide, being straight in axial section and may be inclined with respect to the screw axis. Any angle may be employed although the angles of 6°, 10° and 15° shown in connection with screw 10 are preferred. The root diverges in a direction away from the load.

FIGURE 7 shows the thread relationship when the fastener is threaded into a pre-tapped hole in a female member 65, the section being taken through a lobe of the thread. It will be noted that there is substantial root interference and along one flank there is a void for the accommodation of displaced metal indicated by dots. When threading into a tapped hole, the displacement of metal is radially outward with respect to the fastener.

FIGURE 8 illustrates the thread relationship in the relief areas of the fastener thread, and it will be noted that there are voids at the root and also along both flanks of the fastener thread. These voids, particularly the void along the right flank, will accommodate displaced material. It will be noted that the crest of the internal thread 66 has been cold worked and compacted by the root of the preceding lobe (FIG. 8) so that it has generally the same taper as the root of the screw. The original shape of the internal thread is indicated in FIGURE 7. It will be understood, of course, that in some instances there may be no void at the root even in the regions of relief. Nevertheless, the interference will at least be relieved at these points. In any event, there is maximum interference midway between the points of relief, that is at lobes 63, diminishing progressively in both directions.

Since the root interference is at least partially relieved at circumferentially spaced points, the assembly drag torque, as well as band pressure, is substantially lower than for a fastener of the type shown in my prior patent. Moreover, the improved fastener of FIGURES 6–8 permits the tapped hole to have its crest formed within a wider tolerance range without unduly affecting the level or range of assembly drag torque. The same is true of the fastener of FIGURES 1–5 when screwed into a tapped hole.

What I claim as my invention is:

1. A self-locking male member having a continuous external rolled thread, a female member formed with an aperture and having a continuous internal female thread mating with said male thread, the root of said male thread extending generally helically but in each of at least several convolutions having circumferentially uniformly spaced lands located farther from the axial center of said male member than the intervening portions thereof, said lands and intervening portions merging and blending smoothly with one another, the crest of said female thread extending generally helically and, in those convolutions mating with the aforesaid convolutions of said male thread having a predetermined material interference with said lands but being spaced from said intervening portions whereby to provide voids between said crests and intervening portions, the engaged root of said male thread and crest of said female thread in the aforesaid mating convolutions being of substantial width measured axially to provide broad load-bearing surfaces, the cross dimension of the axial projection of the root of said male member in the aforesaid convolutions thereof measured through the axis of said male member being the same at every angle, the axis of said male member coinciding with the center of the cylinder within which said axial projection is inscribed.

2. The male and female members defined in claim 1, wherein all circumferentially extending portions of the root of said male thread in the aforesaid convolutions thereof are convex.

3. Male and female members as defined in claim 2, wherein the distance from the center of said male member to said lands is a maximum at the mid-points of said lands and gradually decreases toward the ends of said lands for maximum crest-root interference at said mid-points diminishing gradually toward said ends.

4. Male and female members as defined in claim 2, wherein said male thread in the aforesaid convolutions thereof is of uniform size and shape throughout the circumference of said member.

References Cited by the Examiner

UNITED STATES PATENTS

| | | | |
|---|---|---|---|
| 2,352,982 | 7/1944 | Tomalis | 85—47 |
| 2,437,638 | 3/1948 | Evans | 151—14 |
| 2,484,644 | 10/1949 | Poupitch | 151—22 |
| 2,788,046 | 4/1957 | Rosan | 151—22 |
| 2,856,617 | 10/1958 | Widmann | 151—14 |
| 2,873,641 | 2/1959 | Evans | 151—22 |
| 2,991,491 | 7/1961 | Welles | 10—152 |
| 3,050,755 | 8/1962 | Welles | 10—152 |

FOREIGN PATENTS

| | | |
|---|---|---|
| 210,236 | 7/1960 | Austria. |
| 223,231 | 6/1956 | Japan. |

EDWARD C. ALLEN, *Primary Examiner.*